US007499027B2

(12) United States Patent
Brigham, II et al.

(10) Patent No.: US 7,499,027 B2
(45) Date of Patent: Mar. 3, 2009

(54) USING A LIGHT POINTER FOR INPUT ON AN INTERACTIVE DISPLAY SURFACE

(75) Inventors: Robert Allan Brigham, II, Woodinville, WA (US); David Joshua Kurlander, Seattle, WA (US); Nigel S. Keam, Redmond, WA (US); Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 678 days.

(21) Appl. No.: 11/117,979

(22) Filed: Apr. 29, 2005

(65) Prior Publication Data

US 2006/0244719 A1 Nov. 2, 2006

(51) Int. Cl.
*G06F 3/033* (2006.01)
(52) U.S. Cl. .................................. 345/158; 345/175
(58) Field of Classification Search ......... 345/156–158, 345/175
See application file for complete search history.

(56) References Cited

U.S. PATENT DOCUMENTS

| | | | |
|---|---|---|---|
| 4,992,650 A | 2/1991 | Somerville | 235/462 |
| 5,319,214 A | 6/1994 | Gregory | |
| 5,436,639 A | 7/1995 | Arai | |
| 5,483,261 A | 1/1996 | Yasutake | |
| 5,526,177 A | 6/1996 | Fantone | |
| 5,528,263 A | 6/1996 | Platzker | |
| 5,821,930 A | 10/1998 | Hansen | |
| 5,831,601 A | 11/1998 | Vogeley | |
| 5,835,692 A | 11/1998 | Cragun | |
| 5,900,863 A * | 5/1999 | Numazaki | 345/158 |
| 5,920,688 A | 7/1999 | Cooper | |
| 5,940,076 A | 8/1999 | Sommers | |

(Continued)

FOREIGN PATENT DOCUMENTS

EP 0690407 1/1996

(Continued)

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

(Continued)

*Primary Examiner*—Bipin Shalwala
*Assistant Examiner*—Kenneth B Lee, Jr.
(74) *Attorney, Agent, or Firm*—Workman Nydegger

(57) ABSTRACT

A light pointer is selectively activated to direct a light beam onto an interactive display surface, forming a pattern of light that is detected by a light sensor disposed within an interactive display table. The waveband of the light produced by the light pointer is selected to correspond to a waveband to which the light sensor responds, enabling the light sensor to detect the position of the pattern on the interactive display surface, as well as characteristics that enable the location and orientation of the light pointer to be determined. Specifically, the shape and size of the pattern, and the intensity of light forming the pattern are detected by the light sensor and are processed to determine the orientation of the light pointer and its distance from the interactive display surface. The pattern may comprise various shapes, such as circles, arrows, and crosshairs.

4 Claims, 8 Drawing Sheets

U.S. PATENT DOCUMENTS

| | | | |
|---|---|---|---|
| 5,973,315 A * | 10/1999 | Saldana et al. | 250/214 VT |
| 6,128,003 A | 10/2000 | Smith | |
| 6,154,214 A | 11/2000 | Uyehara | |
| 6,266,061 B1 | 7/2001 | Doi | |
| 6,340,119 B2 | 1/2002 | He | |
| 6,414,672 B2 | 7/2002 | Rekimoto et al. | |
| 6,448,987 B1 | 9/2002 | Easty | |
| 6,469,722 B1 | 10/2002 | Kinoe | |
| 6,476,378 B2 | 11/2002 | Nougaret | |
| 6,520,648 B2 | 2/2003 | Stark | |
| 6,522,395 B1 | 2/2003 | Barnji | |
| 6,529,183 B1 | 3/2003 | MacLean | |
| 6,614,422 B1 | 9/2003 | Rafii | |
| 6,654,007 B2 | 11/2003 | Ito | |
| 6,690,363 B2 | 2/2004 | Newton | |
| 6,710,770 B2 | 3/2004 | Tomasi | |
| 6,720,949 B1 | 4/2004 | Pryor | |
| 6,750,877 B2 | 6/2004 | Rosenberg | |
| 6,781,069 B2 | 8/2004 | Silverstein | |
| 6,791,530 B2 | 9/2004 | Vernier | |
| 6,812,907 B1 | 11/2004 | Gennetten | |
| 6,840,627 B2 | 1/2005 | Olbrich | |
| 6,959,102 B2 | 10/2005 | Peck | |
| 7,075,687 B2 | 7/2006 | Lippert | |
| 7,084,859 B1 | 8/2006 | Pryor | |
| 7,120,280 B2 | 10/2006 | Biswas | |
| 7,161,578 B1 * | 1/2007 | Schneider | 345/156 |
| 7,204,428 B2 | 4/2007 | Wilson | |
| 7,268,774 B2 | 9/2007 | Pittel | |
| 7,310,085 B2 * | 12/2007 | Holloway et al. | 345/158 |
| 2002/0006786 A1 | 1/2002 | Mine | |
| 2003/0161524 A1 | 8/2003 | King | |
| 2004/0005920 A1 | 1/2004 | Soltys | |
| 2004/0090524 A1 | 5/2004 | Belliveau | |
| 2004/0196371 A1 | 10/2004 | Kono | |
| 2005/0050476 A1 | 3/2005 | SanGiovanni | |
| 2005/0122306 A1 | 6/2005 | Bell | |
| 2005/0122308 A1 | 6/2005 | Bell | |
| 2005/0226467 A1 | 10/2005 | Hatano | |
| 2005/0226505 A1 | 10/2005 | Wilson | |
| 2005/0227217 A1 | 10/2005 | Wilson | |
| 2005/0245302 A1 | 11/2005 | Bathiche | |
| 2005/0277071 A1 | 12/2005 | Yee | |
| 2005/0281475 A1 | 12/2005 | Wilson | |
| 2006/0010400 A1 | 1/2006 | Dehlin | |
| 2006/0034492 A1 | 2/2006 | Siegel | |
| 2006/0056662 A1 | 3/2006 | Thieme | |
| 2006/0092170 A1 | 5/2006 | Bathiche | |
| 2006/0289760 A1 | 12/2006 | Bathiche | |
| 2007/0063981 A1 | 3/2007 | Galyean | |
| 2007/0126717 A1 | 6/2007 | Cohen | |
| 2007/0157095 A1 | 7/2007 | Bilow | |
| 2007/0279494 A1 | 12/2007 | Aman | |

FOREIGN PATENT DOCUMENTS

| | | |
|---|---|---|
| FR | 27656077 | 5/1998 |
| WO | 98/19292 | 5/1998 |

OTHER PUBLICATIONS

"Bar Code 1, 2-Dimensional Bar Code Page." Available http://www.adams1.com/pub/russadam/stack.html. Printed Jan. 20, 2004. 14pp.

Ambiente article. "InteracTable®." Dated 07-Jul.-2k. Available http://www.darmstadt.gmd.de/ambiente/activities/interactable.html. Printed Nov. 21, 2003. 3 pp.

Bier, Stone, Pier, Buston, and DeRose. "Toolglass and Magic Lenses: The See-Through Interface." *Proceedings of Siggraph '93* (Anaheim, Aug.),*Computer Graphics Annual Conference Series*, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Technology." *UIST '01* Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3 pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceedings of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR'2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjjan, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-Jul. 3, 2004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8, No. 4, Dec. 2001. © ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Gré;goire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © ACM 1-58113-327-8/01/0003. 8pp.

Reznik, Canny and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interactions with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (13DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electrical Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5 pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

SMART Technologies Inc. White Paper. "DViT Digital Vision Touch Technology." Feb. 2003. 10pp.

Smart Technologies, Inc. "Rear Projection SMART Board ™ Interactive Witeboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/, Printed Dec. 30, 2003, 27 pp.

Streitz, Geiβler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99 )*, Pittsburgh, Pennsylvania, May 15.-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM-ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11p.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL Jan. 2001, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © ACM 1-58113-636-6/03/0010. pp. 193-202.

Northrop Grumman "TouchTable™ " Brochure © 2005 Northrop Grumman Space & Mission Systems Corp. RS1190705. 2pp.

U.S. Appl. No. 12/110,032, filed Apr. 25, 2008, Bathiche.

U.S. Appl. No. 12/106,910, filed Apr. 21, 2008, Wilson.

Hardenberg Von Christian, "Fingertracking and Handposture Recognition for Real-Tim Human-Computer Interaction", Berlin, Jul. 20, 2001.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Pavlidis, Ioannis, et al. "A Vehicle Occupant Counting System Based on Near-Infrared Phenomenology and Fuzzy Neural Classification", IEEE Transactions on Intelligent Transportation Systtem, New York, NY, vol. 1, No. 2, Jun. 2000, pp. 78-80.

"The Tracking Cube: A Three Dimensional Input Device" IBM Technical Disclosure Bulletin, IBM Corp. New York, US, vol. 32, No. 3B; Aug. 1, 1989, pp. 91-95.

Northop Grumman "TouchTable™ " Brochure © 2005 Northop Grumman Space & Mission Systems Corp. RS1190705. 2pp.

Department of Defence, Department of Defence Logistics Automatic Indentification Technology Handbook for Product and Shipping Label Quality Assurance, Feb. 15, 2000, p. 14, Section 3.3.3.6, http://www.dodait.com/conf/data1199/printquality/print0111r6.doc.

Office Action mailed Jun. 29, 2007 cited in related U.S. Appl. No. 10/834,675.

Office Action dated Aug. 30, 2007 cited in related U.S. Appl. No. 10/870,777.

Office Action dated Dec. 13, 2007 cited in related U.S. Appl. No. 10/834,675.

Office Action dated Oct. 9, 2007 cited in related U.S. Appl. No. 10/867,434.

Notice of Allowance dated Feb. 28, 2008 cited in related U.S. Appl. No. 10/870,777.

Notice of Allowance dated Mar. 28, 2008 cited in related U.S. Appl. No. 10/834,675.

Notice of Allowance dated Feb. 27, 2008 cited in related U.S. Appl. No. 10/814,761.

Office Action dated Mar. 25, 2008 cited in related U.S. Appl. No. 10/880,167.

Notice of Allowance dated Apr. 23, 2008 cited in related U.S. Appl. No. 10/969,746.

Office Action dated Oct. 9, 2007 cited in related U.S. Appl. No. 10/813,855.

Office Action dated May 7, 2008 cited in related U.S. Appl. No. 10/813,855.

Office Action dated Jun. 26, 2008 cited in related U.S. Appl. No. 11/364,319.

Office Action dated Jul. 10, 2008 cited in U.S. Appl. No. 10/867,434.

Office Action dated Feb. 8, 2008 cited in U.S. Appl. No. 11/321,551.

Office Action dated Aug. 19, 2008 cited in U.S. Appl. No. 11/321,551.

Notice of Allowance dated Oct. 16, 2007 cited in U.S. Appl. No. 10/814,761.

Office Action mailed Aug. 29, 2008 cited in U.S. Appl. No. 10/870,777.

Office Action dated Sep. 2, 2008 cited in U.S. Appl. No. 11/170,234.

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

Lensch, Hendrick P.A.; Goesele, Michael; Jan Kautz; Hans-Peter Seidel; "A Framework for the Acquisition, processing, Transmission, and Interactive Display of High Quality 3D Models on the Web" Research Report, Max-Planck-Institute, May 2001; Sections 5 and 8.

Notice of Allowance dated Oct. 8, 2008 cited in U.S. Appl. No. 10/880,167.

Notice of Allowance dated Oct. 17, 2008 cited in U.S. Appl. No. 10/969,746.

Office Action dated Oct. 7, 2008 cited in U.S. Appl. No. 11/218,171.

Office Action dated Oct. 30, 2008 cited in U.S. Appl. No. 12/106,910.

* cited by examiner

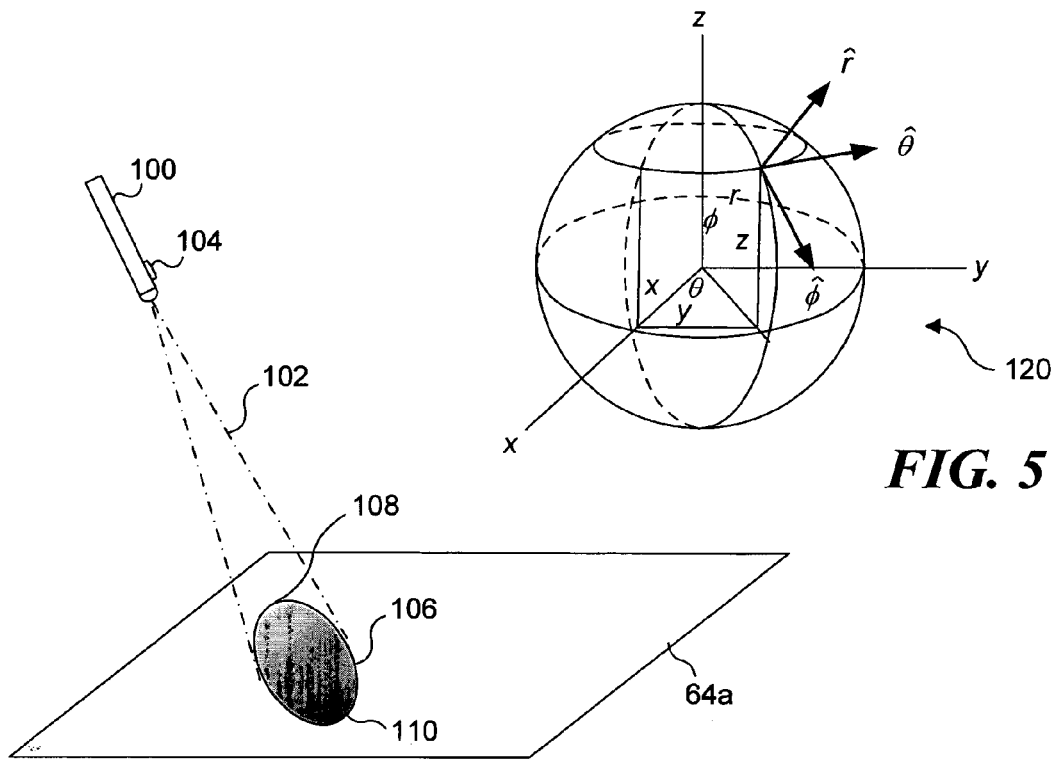
FIG. 4
FIG. 5
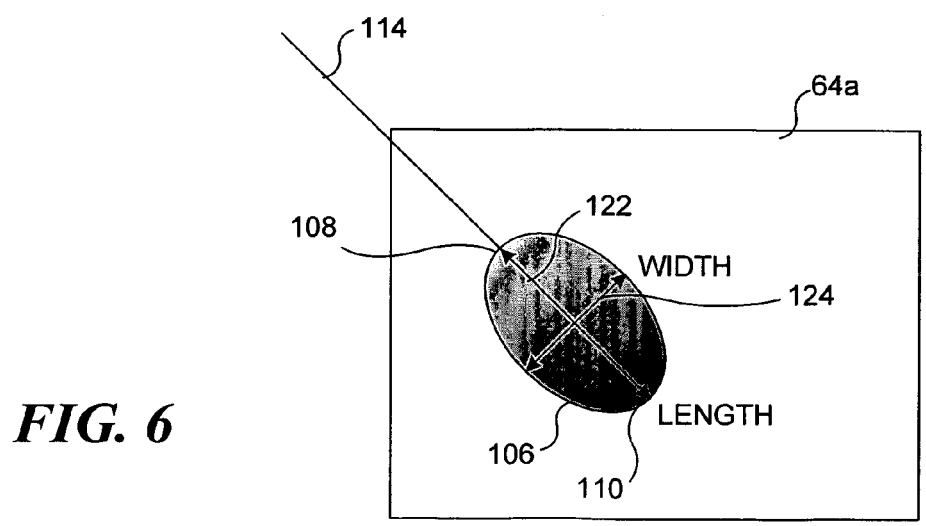
FIG. 6

USING A LIGHT POINTER FOR INPUT ON AN INTERACTIVE DISPLAY SURFACE

FIELD OF THE INVENTION

This invention generally pertains to the use of a light emitting pointer to provide user input with a light beam, and more specifically, to the use of a light pointer to provide this input to an interactive display surface that senses parameters of a pattern produced by the light pointer on the interactive display surface.

BACKGROUND OF THE INVENTION

On most computing devices, the user provides inputs with a keyboard and with a conventional pointing device, such as a mouse, trackball, touchpad, or other pointing button. Such input devices are much less intuitive than touch screens that enable a user to touch a spot on a displayed image and provide an input related to the object, or move the virtual object that is being touched to different positions on the display. However, touch screens are somewhat limited in the scope of user input and interaction that they can provide. For example, most touch screens are only able to detect a single point that is being touched on the screen at a time and are only responsive to a touch on the screen, which precludes more complex simultaneous multiple inputs and a greater degree of user interaction with the computing device.

A further evolution of techniques to facilitate human-machine interaction exploits computer vision technology. For example, the MIT Media Lab, as reported by Brygg Ullmer and Hiroshi Ishii in "The metaDESK: Models and Prototypes for Tangible User Interfaces," *Proceedings of UIST* 10/1997: 14-17," has developed another form of "keyboardless" machine interface. The metaDESK includes a generally planar graphical surface that not only displays computing system output, but also receives user input by recognizing pattern-encoded objects placed against the graphical surface. The graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of the objects placed on the graphical surface.

Similarly, papers published by Jun Rekimoto of the Sony Computer Science Laboratory, Inc., and associates describe a "HoloWall" and a "HoloTable" that use IR light to detect objects. It should be noted that the papers describing the "HoloWall" and "HoloTable" generally are silent regarding the details and process used for detecting objects based upon the IR light reflected from the object.

Examples of other methods and systems for detecting and responding to objects placed on or near a graphical surface are used in inventions owned by the assignee of the present application. These inventions are described, for example, in co-pending U.S. patent applications, including Ser. No. 10/813,855, entitled "Template Matching On Interactive Surface;" Ser. No. 10/814,577, entitled "Identification Of Object On Interactive Display Surface By Identifying Coded Pattern;" and Ser. No. 10/814,761 entitled "Determining Connectedness And Offset Of 3D Objects Relative To An Interactive Surface," all of which were filed on Mar. 31, 2004.

Inventions such as the metaDESK and the other inventions noted above respond to objects on the graphical display surface. However, it would be desirable to enable a graphical display surface to respond to an input that does not involve placing a physical object on or immediately adjacent to the graphical display surface. The ability to provide such an input would enable a user to interact with the graphical display surface from a greater distance. Ideally, the interaction should encompass a variety of different types of input. For example, the user should be able to select an option that is graphically or textually displayed on the surface, or move a virtual object over the graphical display surface, or provide a graphical input that is interpreted as a stylus input or as an input by a drawing implement for producing graphic images, or interact in other ways with the graphical display surface. The ability to provide such input to the interactive display system should thus greatly enhance the user experience and expand the functionality of the system.

SUMMARY OF THE INVENTION

Accordingly, one aspect of the present invention is directed to a method for providing an input to an interactive display system. The interactive display system includes an interactive display surface and is able to display images and optically detect objects that are proximate to the interactive display surface. The method includes the step of enabling a user to provide an input to the interactive display system by directing light from a light source onto the interactive display surface, to illuminate a portion thereof with the light. The light illuminating the portion of the interactive display surface is preferably detected with a light sensor that is also used for detecting light reflected from objects that are proximate to the interactive display surface, but a separate light sensor could instead be used for this purpose. The light sensor produces a signal that is input to the interactive display system.

A disposition and orientation of the light source can be determined based on characteristics of the signal that is produced by the light sensor, i.e., in response to a pattern with which the portion of the interactive display surface is illuminated by the light source. Specifically, a shape and an orientation of the pattern on the interactive display surface is determined, as well as a relative intensity of the light within the pattern between opposite ends of the pattern. A higher intensity of the light at one end of the pattern indicates that end of the pattern is closer to the light source than an opposite end of the pattern.

In one embodiment, the pattern is circular in shape when the light source is directing the light onto the portion of the interactive display surface along a path that is normal to the interactive display surface. However, when the path is not normal to the interactive display surface, the circular pattern becomes elliptical in shape.

The step of determining the disposition and the orientation of the light source can further include the step of determining a distance of the light source from the interactive display surface based upon a size of the pattern. Clearly, the closer the light source is to the interactive display surface, the smaller the pattern will be. Based upon a known spread of the light beam as a function of distance, detecting the size of the pattern thus enables this distance to be determined.

Depending upon the embodiment being used, the pattern can comprise at least one of a crosshair, a projected pointing shape (e.g., an arrow), a rotationally symmetrical shape, and a non-rotationally symmetrical projected shape. If the pattern comprises a crosshair, the method further includes the step of determining the orientation of the light source based upon an angle between lines of the crosshair.

Optionally, the method may include the step of modulating the light produced by the light source to provide a different input to the interactive display system than is provided using light from the light source that is continuous, i.e., not modulated. For example, a modulated light might be used in connection with a drawing program to indicate where a portion of a drawing image encompassed by the pattern of modulated light, is to be erased.

Another aspect of the present invention is directed to an interactive display system that is responsive to an input signal comprising a light pattern. The interactive display system includes an interactive display surface on which images are displayed, and a portable light source that produces a light pattern selectively capable of being directed by a user onto a portion of the interactive display surface. The portable light source is disposed at a selected position and in a selected orientation determined by the user. A light sensor responds to light received from the interactive display surface, producing an input signal to the interactive display system. Also included is a memory in which machine instructions are stored. A processor that is coupled to the light sensor to receive the input signal executes the machine instructions to carry out a plurality of functions. These functions generally correspond to processing the input signal corresponding to the light pattern to determine a location of the portable light source and its orientation.

Yet another aspect of the present invention is directed to a portable, hand-held light source for providing input to an interactive display system. The interactive display system includes an interactive display surface and is able to display images and detect objects that are proximate to the interactive display surface. The portable, hand-held light source includes a housing. In the housing are disposed a battery power supply, a light emitting source that emits light, and a switch. The switch is coupled between the battery power supply and the light emitting source and is selectively activated by a user to energize the light emitting source so that it emits light in a waveband to which the interactive display system is sensitive. A user can direct the light emitted by the light emitting source onto the interactive display surface to form a pattern on a selected portion of the interactive display surface that provides an input to the interactive display system. The shape and relative intensity of the light comprising the pattern indicates a location of the portable, hand-held light source relative to the interactive display surface.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 4 is an isometric schematic view of a light pointer in accord with the present invention, where the light pointer is illuminating a portion of an interactive display surface of the interactive table of FIG. 2 or 3 with light that forms an elliptical pattern;

FIG. 5 illustrates the coordinate system for defining the six degrees of freedom of the light pointer, based upon characteristics of the pattern formed by the light pointer on the interactive display surface;

FIG. 6 illustrates the major and minor axes of an elliptical pattern of light produced by the light pointer, which are used to determine the orientation of the light pointer, as well as the distance of the light pointer from the interactive display surface;

Figure 9A:
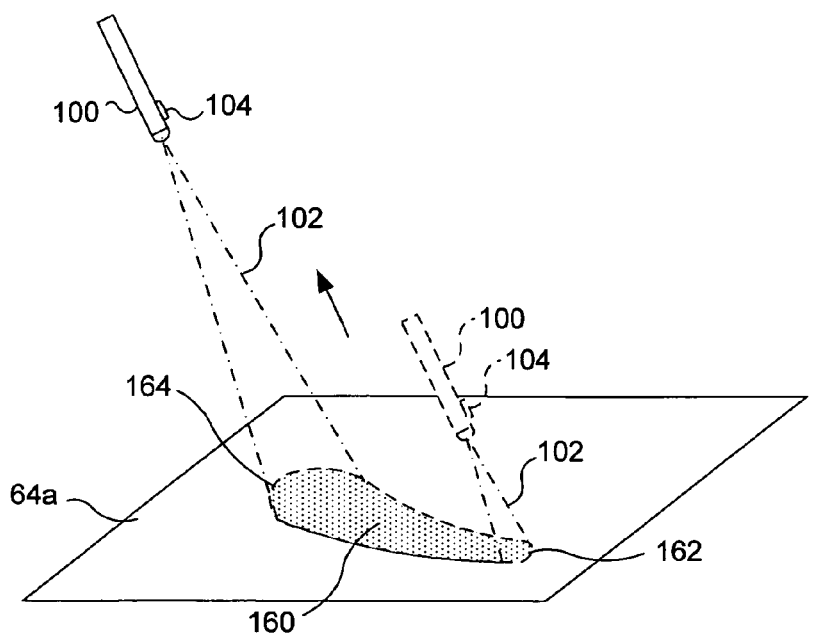
Figure 9B:
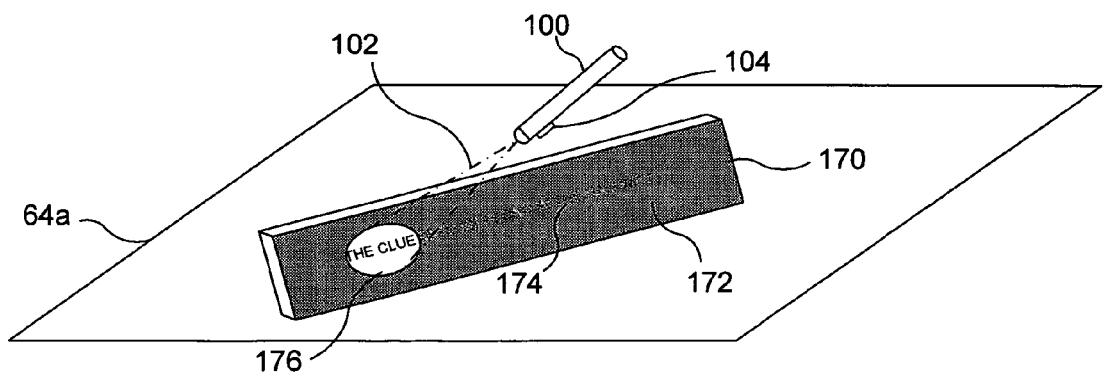
Figure 10:
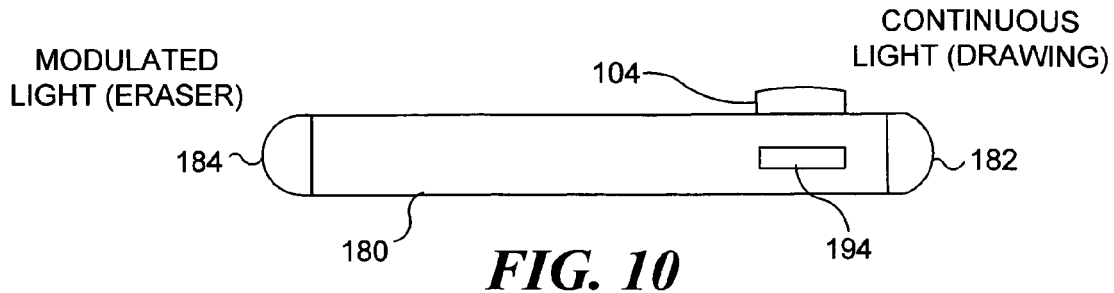
Figure 11:
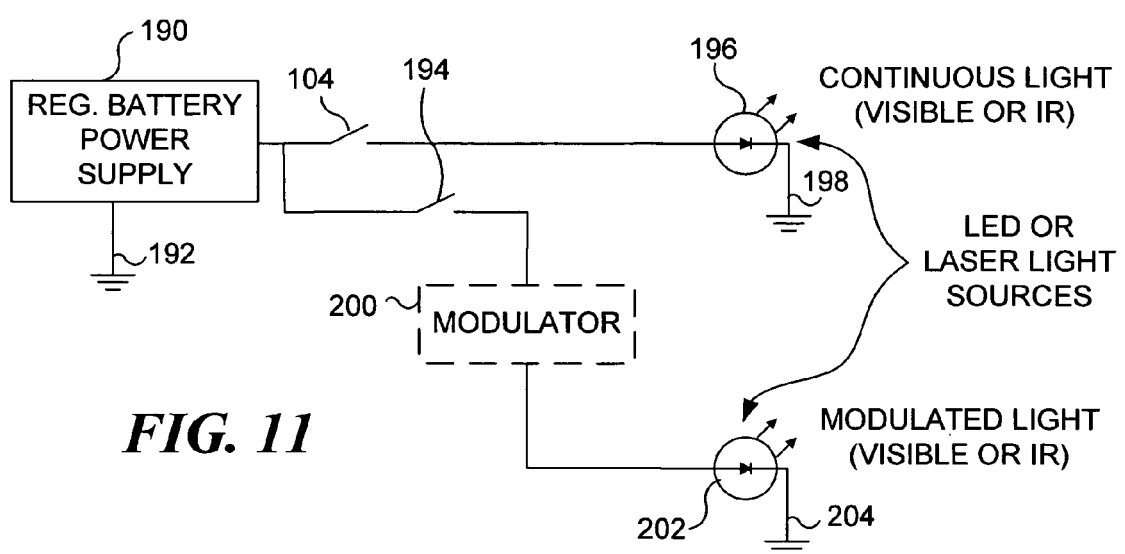
Figure 12:
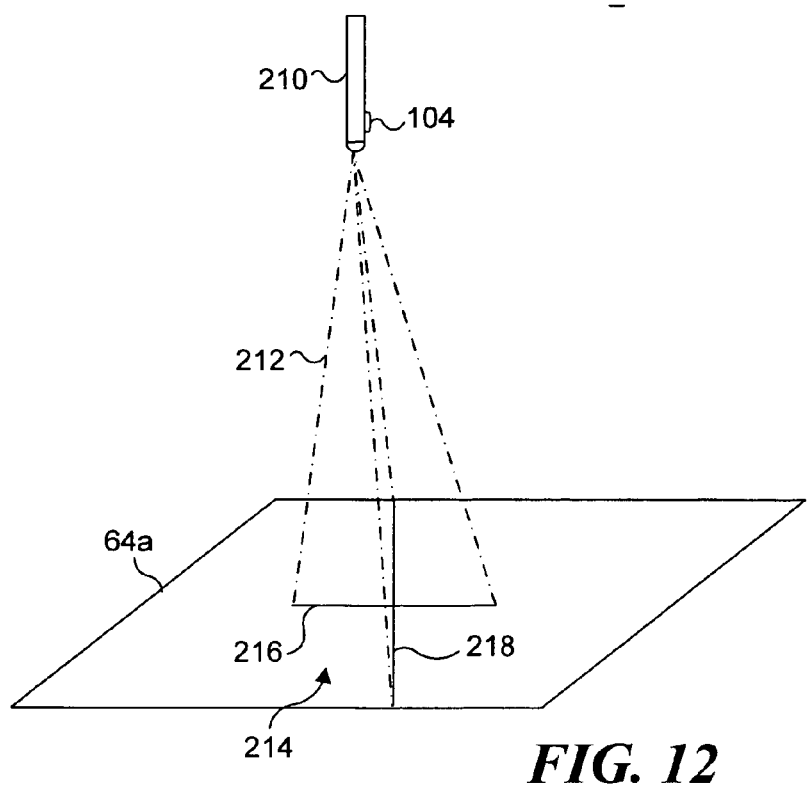
Figure 13:
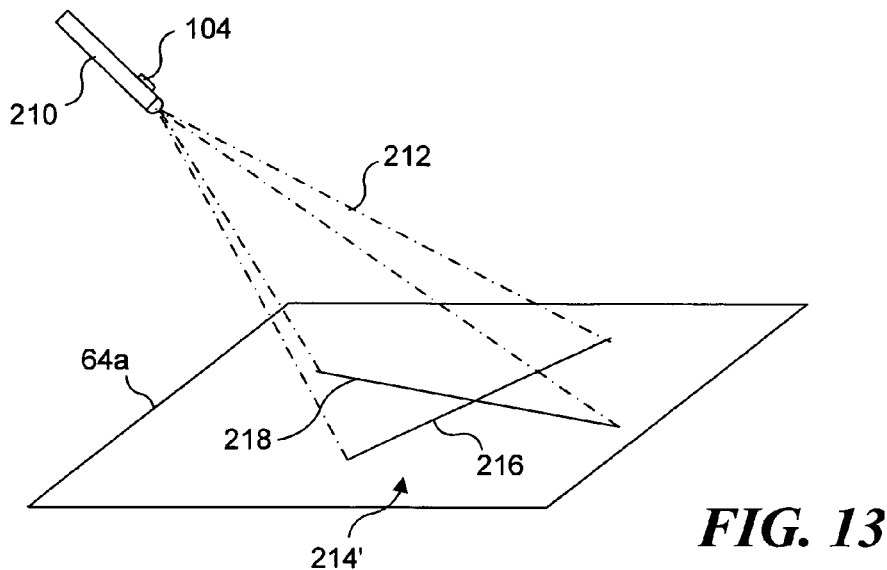
Figure 14:
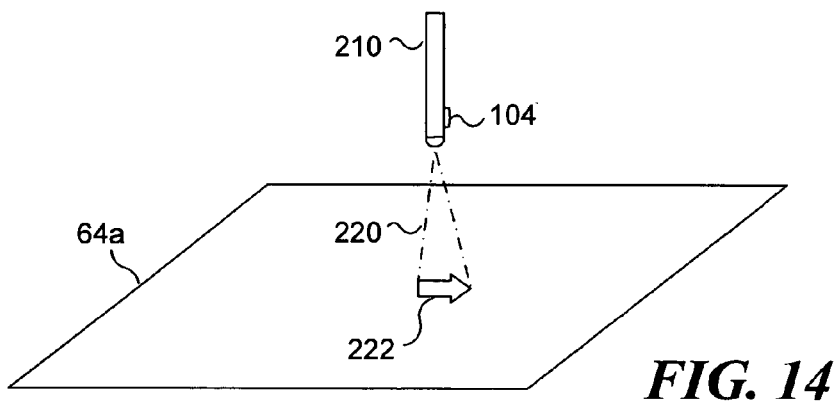
Figure 15:
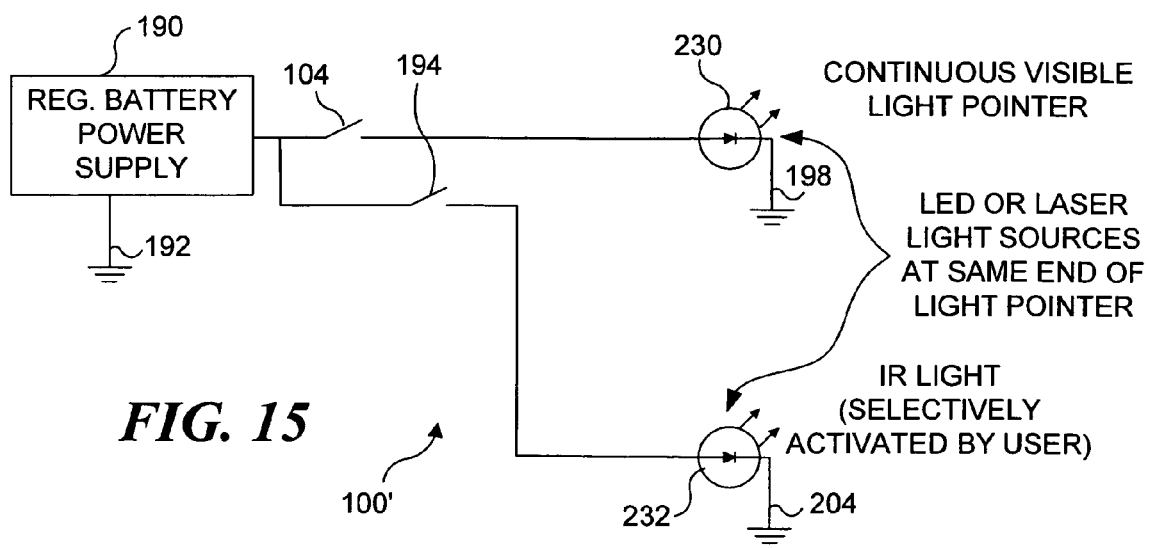

FIG. 9A indicates how the pattern produced by the light pointer can be used as an airbrush in a paint program, illustrating how the distance of the light pointer from the interactive display surface determines the width of the spray pattern displayed in the painting;

FIG. 9B illustrates how a message scribed on a dark wall can be "illuminated" with a virtual flashlight comprising the light pointer;

FIG. 10 is a schematic elevational view of another embodiment of the light pointer that selectively emits light that is continuous from one end and light that is modulated from the opposite end, the modulated light being useful to provide an input that indicates a different function that is to be performed by the interactive display system than the input with the light that is continuous;

FIG. 11 is a schematic block diagram of a light pointer that includes a modulator;

FIG. 12 illustrates a light pointer that uses coherent light from a laser diode to project a crosshair pattern along a path that is substantially normal to the interactive display surface;

FIG. 13 illustrates the light pointer of FIG. 12 projecting a crosshair pattern along a path that is not normal to the interactive display surface, so that oblique and acute angles are formed by the lines comprising the cross hair; and FIG. 14 illustrate a light pointer that projects a pointer shaped pattern (i.e., an arrow); and FIG. 15 is an alternative embodiment of a light pointer with a visible and a non-visible light source that projects a visible light pattern and selectively projects a corresponding non-visible light pattern when the non-visible light source is activated by a user.

DESCRIPTION OF THE PREFERRED EMBODIMENT

Exemplary System for Implementing Present Invention

Figure 1:
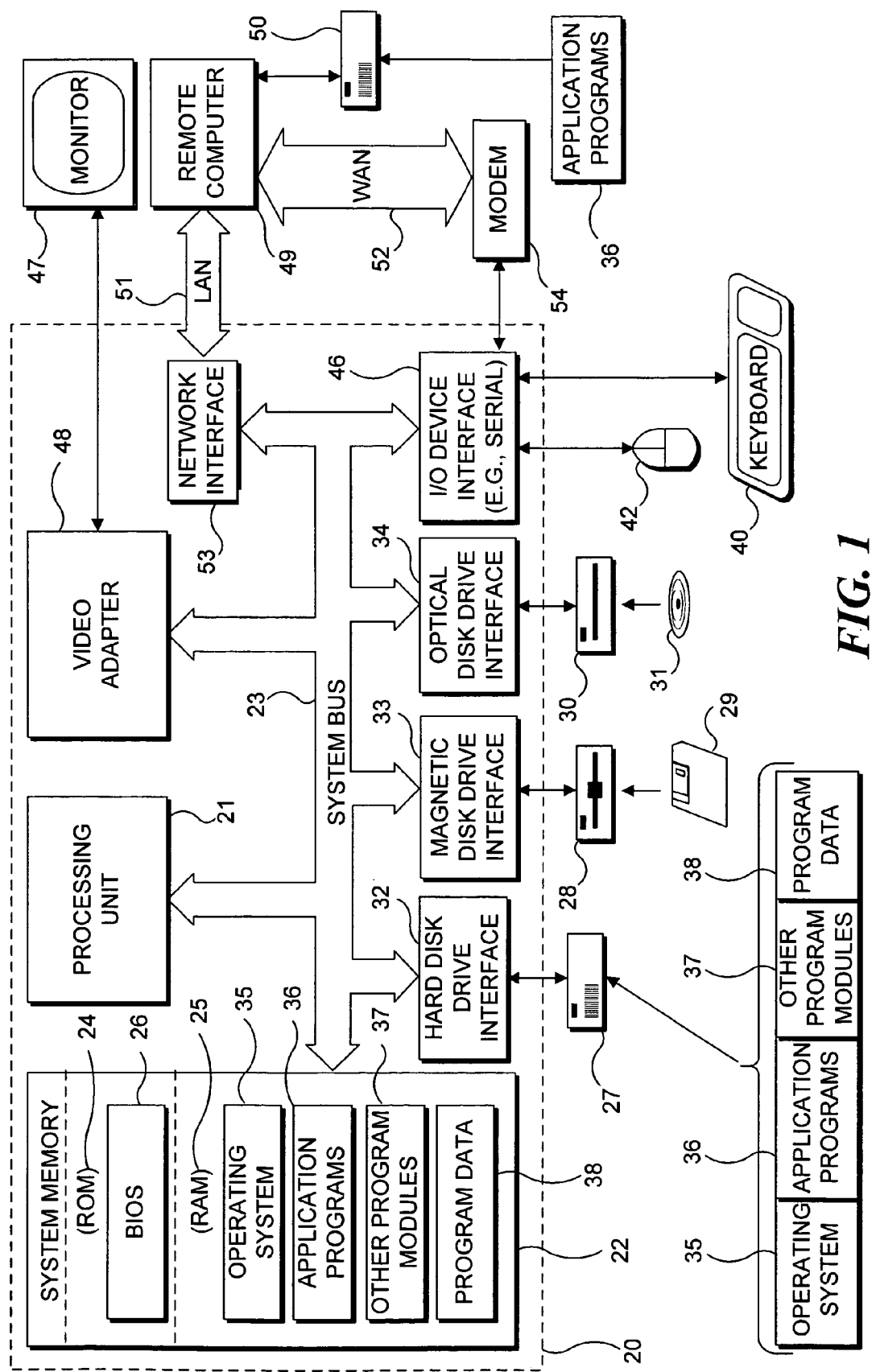
FIG. 1 is a functional block diagram of a generally conventional computing device or personal computer (PC) that is suitable for image processing for the interactive table as used in practicing the present invention.

FIG. 1 is a functional block diagram of an exemplary system suitable for use in connection with the present invention. The system includes a general purpose computing device in the form of a conventional PC 20, provided with a processing unit 21, a system memory 22, and a system bus 23. The system bus couples various system components, including system memory 22, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. The hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk 27, magnetic disk drive 29, optical disk 31, ROM 24, or RAM 25, including an operating system 35, one or more application programs 36, other program modules 37, and program data 38. A user may enter commands and information into PC 20 and provide control input through input devices such as a keyboard 40 and a pointing device 42, as well as with the present invention. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. As discussed below, the interactive display table represents yet another input/output device that is coupled to the PC and which is useful for providing user input with the present invention. These and other input/output (I/O) devices are often connected to processing unit 21 through an I/O interface 46 that is coupled to the system bus 23. The term "I/O interface" is intended to encompass each interface specifically used for any of a serial port, a parallel port, a game port, a keyboard port, and/or a universal serial bus (USB). A monitor 47 or other type of display device is also connected to system bus 23 via an appropriate interface, such as a video adapter 48, although use of the interactive display table with PC 20 will make monitor 47 generally unnecessary, since the interactive display surface of the table serves the function of a monitor and more. In addition to the monitor, PCs are often coupled to other peripheral output devices (not shown), such as speakers (through a sound card or other audio interface—not shown) and printers.

The present invention may be practiced in connection with a single, standalone system; however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to the LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. A modem 54, which may be internal or external, is connected to system bus 23 or coupled to the bus via I/O device interface 46 such as a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Interactive Surface

Figure 2:
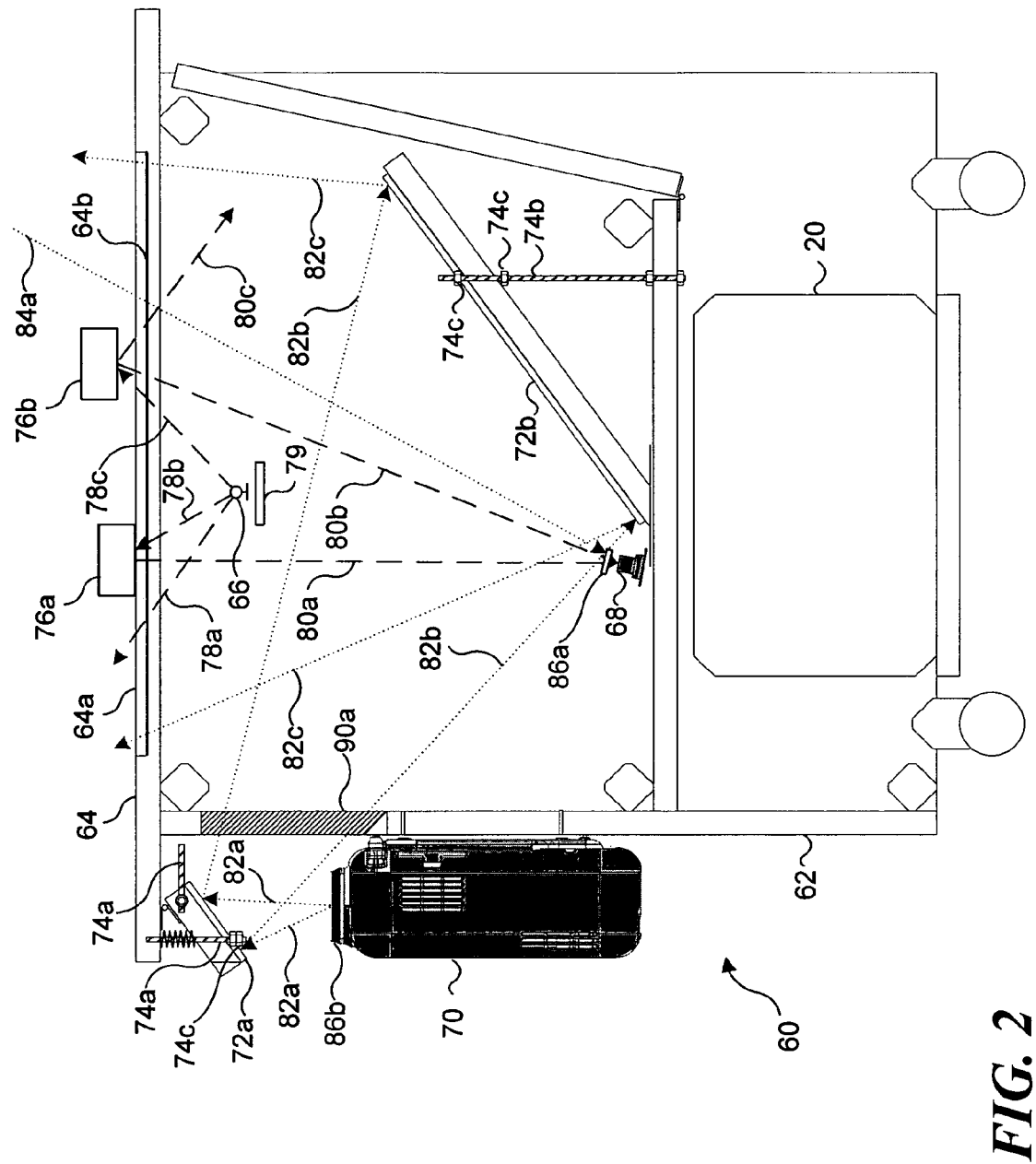
FIG. 2 is a cross-sectional view of the interactive table comprising an interactive display system, illustrating internal components.

In FIG. 2, an exemplary interactive display table 60 is shown that includes PC 20 within a frame 62 and which serves as both an optical input and video display device for the computer. In this cut-away figure of interactive display table 60, rays of light 82a-82c used for displaying text and graphic images are generally illustrated using dotted lines, while rays of infrared (IR) light used for sensing objects on or just above a interactive display surface 64a of interactive display table 60 are illustrated using dash lines. Interactive display surface 64a is set within an upper surface 64 of interactive display table 60. The perimeter of the table surface is useful for supporting a user's arms, or other objects.

IR light sources 66 for illuminating the undersurface of objects placed proximate to the interactive display surface preferably comprise a plurality of IR light emitting diodes (LEDs) and are mounted on the interior side of frame 62. The IR light that is produced by IR light sources 66 is directed upwardly toward the underside of interactive display surface 64a, as indicated by dash lines 78a, 78b, and 78c and is reflected from any objects that are atop or proximate to the display surface after passing through a translucent layer 64b of the table. Translucent layer 64b preferably comprises a sheet of vellum or other suitable translucent material with light diffusing properties. As used herein, the term "adjacent to" is used with the intention that this term encompass both an object that is actually touching the interactive display surface as well as one that is just above the interactive display surface. Although only one IR source 66 is shown within the interactive display table, it will be appreciated that a plurality of such IR sources may be mounted at spaced-apart locations around the interior sides of frame 62 to provide an even illumination of interactive display surface 64a. The light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above interactive display surface 64a include a "touch" object 76a that rests atop the display surface and a "hover" object 76b that is close to but not in actual contact with the display surface. Thus, both touch and hover objects are "adjacent to" the display surface, as that term is used herein. As a result of using translucent layer 64b under the display surface to diffuse the IR light passing through the display surface, as an object approaches the top of interactive display surface 64a, the amount of IR light that is reflected by the object increases to a maximum level that is achieved when the object is actually in contact with the display surface.

A digital video camera 68 is mounted to frame 62 below interactive display surface 64a in a position appropriate to receive IR light that is reflected from any touch object or hover object disposed above interactive display surface 64a. In a preferred embodiment of the present invention, digital video camera 68 also serves as a light sensor for sensing light directed onto the interactive display surface from above, forming a pattern on that surface. The digital video camera 68 is preferably equipped with an IR pass filter 86a that transmits only IR light and blocks ambient visible light traveling through interactive display surface 64a along dotted line 84a, although it is also contemplated that a light sensor sensitive to visible light or light in other wavebands besides the IR may be employed to sense light directed onto the interactive display surface by a light pointer in accord with the present invention. A baffle 79 is disposed between IR source 66 and the digital video camera to prevent IR light that is directly emitted from the IR source from entering the digital video camera, since in this embodiment, it is preferable that this digital video camera should produce an output signal that is only responsive to the IR light reflected from objects that are a short distance above or in contact with interactive display surface 64a and corresponds to an image of IR light reflected from objects on or above the display surface, as well as in response to the pattern of light projected onto the interactive display surface in the present invention. Accordingly, it will be apparent that digital video camera 68 also responds to any IR light that passes through interactive display surface 64a from above and into the interior of the interactive display (including ambient IR light that also travels along the path indicated by dotted line 84a).

IR light reflected from objects on or above the table surface may be:
- reflected back through translucent layer 64b, through IR pass filter 86a and into the lens of digital video camera 68, as indicated by dash lines 80a and 80b; or
- reflected or absorbed by other interior surfaces within the interactive display without entering the lens of digital video camera 68, as indicated by dash line 80c.

Translucent layer 64b diffuses both incident and reflected IR light. Thus, as explained above, "hover" objects such as hover object 76b that are closer to interactive display surface 64a will reflect more IR light back to digital video camera 68 than objects of the same reflectivity that are farther away from the display surface. The digital video camera 68 senses the IR light reflected from "touch" and "hover" objects within its imaging field, as well as the IR light projected onto the interactive display surface in this invention, and produces a digital signal corresponding to images of the reflected and incident IR light that is input to PC 20 for processing to determine a location of each such object or pattern of projected light, and optionally, the size, orientation, and shape of the object. In regard to the present invention, PC 20 also processes the digital signal to determine the orientation, location, and distance of the light pointer from the interactive display surface. It should be noted that a portion of an object, such as a user's forearm, may be above the table while another portion, such as the user's finger, is in contact with the display surface. In addition, an object may include an IR light reflective pattern or coded identifier, such as a bar code, on its bottom surface that is specific to that object or to a class of related objects of which that object is a member. Accordingly, the imaging signal from the digital video camera 68 can also be used for detecting each such specific object, as well as determining its orientation, based on the IR light reflected from its reflective pattern.

The interactive display system is operable to recognize an object and/or its position relative to the interactive display surface 64a by detecting and identifying its identifying characteristic's response to reflected IR light. The logical steps implemented to carry out an exemplary form of identifying one or more such identifying characteristics are explained in the commonly-assigned patent applications—application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," both of which were filed on Mar. 31, 2004. The disclosure and drawings of these two patent applications are hereby specifically incorporated herein by reference. Similarly, the characteristics of a pattern projected onto the interactive display surface by a light pointer of the present invention can be determined in an analogous manner to enable the orientation and location of the light pointer to be determined, as well as to determine its distance from that surface.

Figure 3:
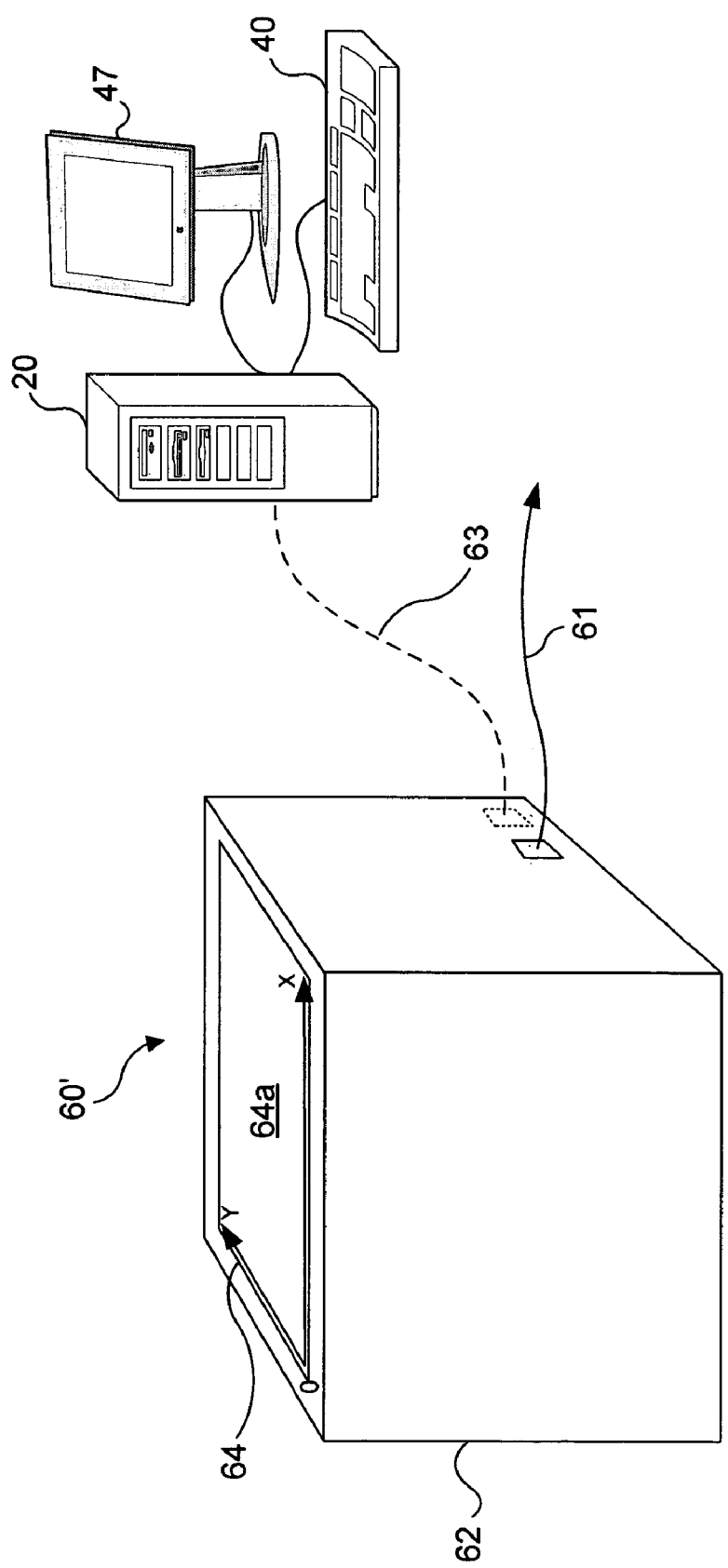
FIG. 3 is an isometric view of the interactive table and an external computing device.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with interactive display surface 64a, as well as an origin indicated by "0." While not discretely shown, it will be appreciated that a plurality of coordinate locations along each orthogonal axis can be employed to specify any location on interactive display surface 64a, and these coordinates also relate to indicating the location of the pattern of light projected onto the interactive display surface, as well as the location of the light pointer used to project the pattern.

If interactive display table 60' is connected to an external PC 20 (as in FIG. 3) or to some other type of external computing device, such as a set top box, video game, laptop computer, or media computer (not shown), then interactive display table 60' comprises an input/output device for the external computing device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to employ the more intuitive user interface functionality of interactive display table to good advantage, as well as executing other software applications that are not specifically designed to make use of such functionality, but can still make good use of the input and output capability of the interactive display table.

An important and powerful feature of interactive display table 60 or 60' (i.e., of either of the embodiments of the interactive display table discussed above) is its ability to display graphic images or a virtual environment for games or other software applications and to enable an interaction between the graphic image or virtual environment visible on interactive display surface 64a. In addition the interactive display table is able to identify objects that are resting atop the display surface, such as an object 76a, or objects that are hovering just above it, such as an object 76b in FIG. 2. The present invention expands upon this functionality, as explained below, by enabling a light pointer to be used for a more remote input to the interactive display system.

Again referring to FIG. 2, interactive display table 60 includes a video projector 70 that is used to display graphic images, a virtual environment, or text information on interactive display surface 64a. The video projector is preferably of a liquid crystal display (LCD) or digital light processor (DLP) type, with a resolution of at least 640×480 pixels. An IR cut filter 86b is mounted in front of the projector lens of video projector 70 to prevent IR light emitted by the video projector from entering the, interior of the interactive display table where the IR light might interfere with the IR light reflected from object(s) on or above interactive display surface 64a or light projected onto the surface by the light pointer of the present invention. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64b, which is at the focal point of the projector lens, so that the projected image is visible and in focus on interactive display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

The foregoing and following discussions describe an interactive display device in the form of interactive display table 60 and 60'. Nevertheless, it is understood that the interactive display surface need not be in the form of a generally horizontal table top. The principles described in this description of the interactive display system suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent to the display surface. Similarly, the pattern of light projected onto the interactive display surface can be projected from the side of a vertically oriented interactive display surface.

Light Pointer Orientation and Position

FIG. 4 schematically illustrates an example showing how a light pointer 100 casts a light beam 102 when a switch 104 is selectively activated to form a pattern 106 on interactive display surface 64a. In this example, pattern 106 is elliptically shaped since light beam 102 is not normal to interactive display surface 64a, but is instead angled toward the interactive display surface. FIG. 5 illustrates the various angles 120 defining the orientation of light pointer 100 relative to the interactive display surface. With reference to FIG. 6, a ratio between a width 124 and a length 122 of pattern 106 can be used to calculate the polar angle φ, which is equal to arcsin of the ratio. Length 122 of pattern 106 (the longest dimension) is colinear with the azimuthal angle θ. It should be apparent that the light pointer could form the same elliptical-shaped pattern for a positive or negative polar angle. However, the direction of the light pointer relative to the interactive display surface is determined by detecting the brighter end of the ellipse, which will be the closest end of the ellipse to the light pointer. In the example illustrated in FIGS. 4 and 6, it will be apparent that an end 108 of the ellipse comprising pattern 106 is brighter than an end 110. As indicated in FIG. 6, light from light pointer 100 travels along a path 114 and end 108 is brighter because it is closer to the light pointer. It should be apparent that if the light pointer is oriented to direct light beam 102 directly down onto interactive display surface 64a, along a path that is normal to the interactive display surface, pattern 106 will be circular shaped. Other patterns that might be formed using a light pointer in connection with the present invention are discussed in below.

It is also possible for the interactive display system to process the light pattern formed on the interactive display surface to approximately determine a distance between that surface and the light pointer. Specifically, if the spread of the light beam produced by the light pointer is known, the size of pattern 106 provides a reasonably good indication of a distance (along the z axis) between the light pointer and the interactive display surface.

One advantage of being able to detect the orientation and position of light pointer 100 relative to interactive display surface 64a is that it enables an application to determine from which side of the interactive display surface light beam 102 is being directed onto the interactive display surface. Accordingly, if multiple users each have a light pointer 100, the interactive display system can determine which player is directing a light pattern onto the interactive display surface, based upon the side of the interactive l display surface where the light pointer producing the light pattern is disposed. The users are playing a game, the interactive display system can thus determine which player is providing an input to the game using the light pointer, assuming the players are each associated with a different position or side around the interactive display surface.

In a preferred embodiment of the present invention, digital video camera 68 is used as a light sensor to sense pattern 106, which is formed on interactive display surface 64a by light pointer 100. The digital video camera can determine the location of the pattern, its shape, the dimensions of its length and width, and the variations of light intensity within the pattern. The location of the pattern on interactive display surface 64a is controlled by the user who aims light pointer 100 to direct light beam 102 where desired. Thus, the user can selectively activate light pointer 100 by depressing switch 104 when light pointer 100 is aimed so as to form pattern 106 where desired by the user. Light pointer 100 can thus be used for selecting a virtual object or an item in a menu displayed on interactive display surface 64a, or for almost any other input that might otherwise be provided using a mouse or other pointing device. Once a virtual object is selected by projecting the pattern onto it with the light pointer, the pattern can be moved to move the virtual object around on the interactive display surface, as defined by the application program that produces the virtual object. This and other functions carried out in response to the location of the pattern projected onto the interactive display surface will thus be defined by the application program with which the light pointer is being used.

Exemplary Applications Using the Light Pointer Input

Figure 7:
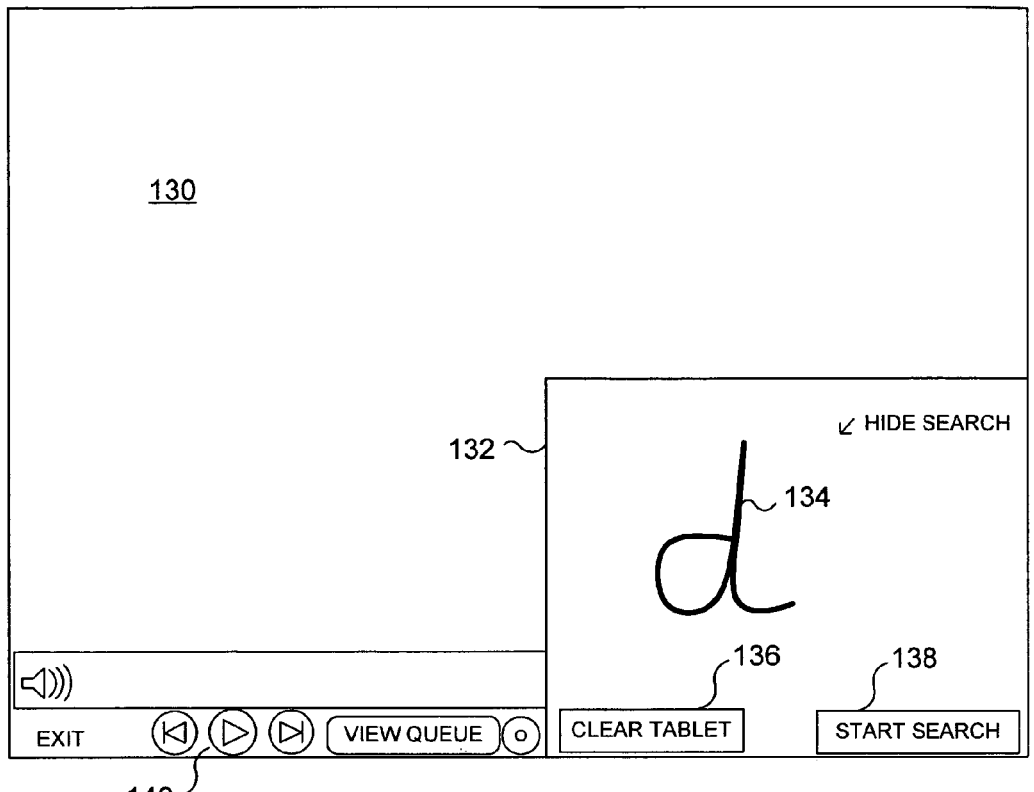
FIG. 7 illustrates how the light pointer can be used to input a letter that will be used for performing a search in a music database application.

While the number of applications in which the present invention can be used in connection with the interactive display system is virtually unlimited, FIGS. 7, 8, 9A, and 9B illustrates several different examples that show some of the advantages of this invention for providing input to the interactive display system. FIG. 7 illustrates how the present invention can facilitate a search for albums included in a music database collection that start with a letter entered by a user with the light pointer. In this simple example, an application window 130 includes a search dialog window 132 in which a user has employed the light pointer to form a letter 134, which in the example shown, is the letter "d." To form this letter, the user simply holds the light pointer relatively close to the interactive display surface so that the spread of the light is minimal and then draws the letter freehand. Optionally, more than one letter could be drawn with the light pointer to narrow the search to those albums starting with the letters thus input. The interactive display system can recognize the letter(s) using a simple optical character recognition scheme, as will be readily understood by those of ordinary skill in the art. Also shown in FIG. 7 is a control 136 to clear the search dialog window of input, and a control 138 to start the search for albums with titles that begin with letter 134. A conventional set of play controls 140 is also provided, for use in controlling the play of a selected album, song, or playlist of music in the database that has been selected. It should be understood that the light pointer can be selectively activated so that the pattern it produces is used to select any of these controls.

Figure 8:
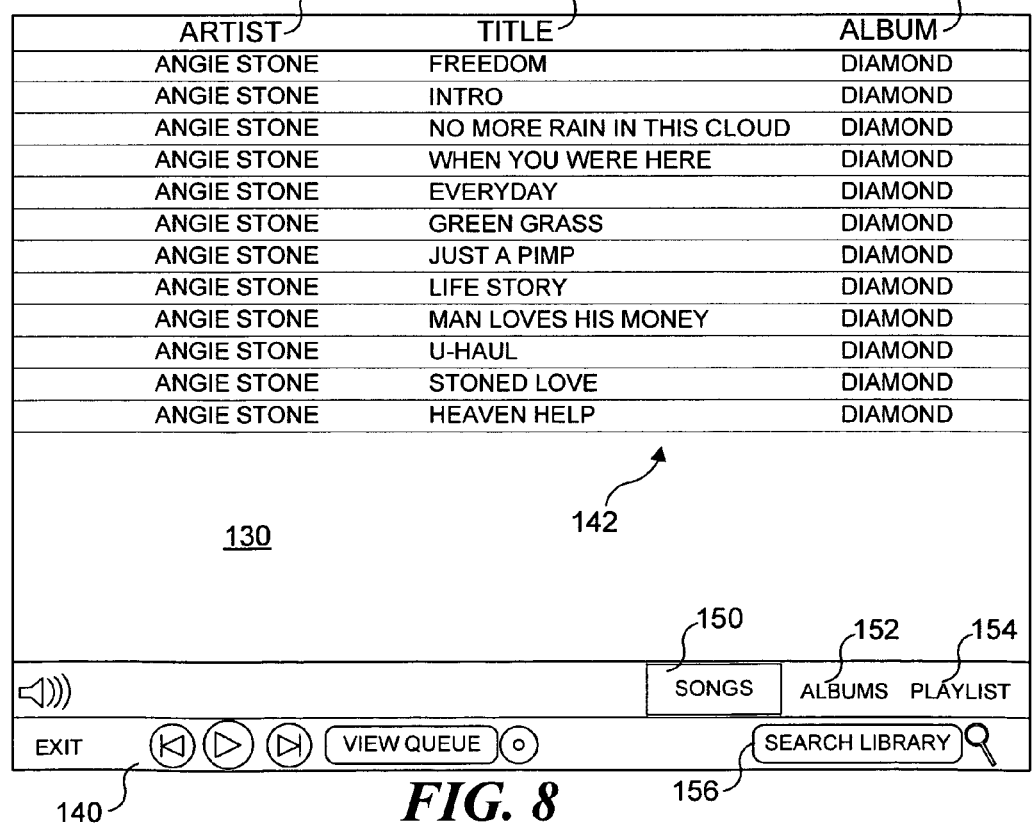
FIG. 8 illustrates exemplary search results in the music database application, in response to input of the letter in FIG. 7.

In FIG. 8, application window 130 includes search results 142 that are produced after the user has activated control 138 to start the search for albums beginning with the letter "d." In this simple example, only one album, "Diamond," starts with that letter. Application window 130 includes headings for the music database data, such as an Artist heading 144, a Title heading 146, and an Album heading 148. A control 150 is highlighted to indicate that the user has selectively chosen to display the data for search results 142 as a listing of songs in the album(s) that start with the letter previously entered using the light pointer. Alternately, the user could have chosen a control 152 to display the search results only as albums. A control 154 displays a playlist. Also provided is a control 156 to initiate another search of the library and if activated, would bring up search dialog window 132 as shown in FIG. 7.

Since the size of the pattern produced on interactive display surface 64a is a function of the distance from the interactive display surface that light pointer 100 is positioned by the user, the light pointer is very useful for providing input in a painting application. For example, the light pointer can serve as an airbrush. FIG. 9A schematically illustrates the advantage of using light pointer 100 in such an application. Initially, light pointer 100 is held relatively close to interactive display surface so the light beam 102 produces a pattern 160 having a relatively small size as indicated at an end 162. As the user moves light pointer 100 toward an end 164 and simultaneously moves the light pointer away from the interactive display surface, the size of the pattern increases toward end 164. In addition, by detecting the angle of the light pointer relative to the interactive display surface, the painting application can employ the angle data to vary the effective shape of the airbrush, brush, or other painting tool that the light pointer has been selectively set to emulate. The result is a very realistic representation of the stroke that would be made by such a painting tool.

It is important to understand that pattern 160, which will typically be invisible to the user because it is produced by light beam 102 of IR light, is not the airbrush stroke seen in the painting. Instead, the painting application determines the size and position of the light pattern and forms a virtual image of a corresponding airbrush stroke that is visible on the interactive display surface. As the user becomes more facile in using light pointer 100, and in controlling when and where light beam 102 is produced, the user can produce relatively complex airbrush strokes in the paint program. Of course, light pointer 100 can also be used as a pen/pencil, or as a paintbrush in a paint program. For such input, it will typically be held closer to the interactive display surface. The light pointer can also be used to select different colors that are applied within the paint program with the light pointer as it then serves as an airbrush, a brush, or pen/pencil, or for input of some other medium such as chalk.

In another exemplary application, light pointer 100 is used like a virtual flashlight, as illustrated in FIG. 9B. In this example, a three-dimensional image 170 of a wall 172 is displayed on interactive display surface 64a. Wall 172 includes a line of text 174 on its surface, but the text is virtually impossible to read because the surface of the wall is made to appear relatively dark. The text can be easily read if a user holds light pointer 100 so that light beam 102 is directed toward the line of text while switch 104 is activated. The light pointer then appears to project a visible light beam that illuminates the text encompassed by the light, as illustrated in an elliptical area 176. Even though light beam 102 may be formed using IR light that is not visible to the human eye, the interactive display system responds to the size and location of the pattern produced by this light beam, by creating a virtual illuminated region corresponding to that illuminated by light beam 102. In this region, the text is made visible by the interactive display system and can be easily read by the user. Instead of this simple illustration, it is not difficult to imagine a more complex application of this concept. For example, a game might include a darkened house in which various objects are disposed that are difficult to see until "illuminated" with the virtual flashlight represented by light pointer 100.

Components of a Light Pointer

FIGS. 10 and 11 illustrate components of a light pointer 180, which is generally identical to light pointer 100 except that it includes additional components, as discussed below. Specifically, light pointer 180 includes a continuous light source 182, just as is included in light pointer 100. But, in addition, light pointer 180 includes a modulated light source 184. Continuous light source 182 can be employed in many different software applications, to provide user input to the interactive display surface. For example, as noted above, in a paint program, the continuous light source on light pointer 100 can be used for airbrushing or drawing lines and other elements. In such a paint program, modulated light source 184 can be selectively energized to carry out a different predefined function, such as to erase selected components in a drawing. A switch 194 is thus included in light pointer 180 for selectively energizing modulated light source 184. Also included within the housing of light pointer 180 (as well as light pointer 100) is a regulated battery power supply 190, which is coupled to a ground 192. An output voltage from related battery power supply 190 is coupled in parallel to switch 104, and to switch 194. In light pointer 100, only switch 104 is included. The other side of switch 104 is connected to a light emitting source 196, which is also connected to a ground 198. In light pointer 180, the other side of switch 194 is connected to a modulator 200. Modulator 200 modulates the electrical current supplied to a light emitting source 202 so that the light emitting source emits correspondingly modulated light. The modulation frequency of modulator 200 is sufficiently low (e.g., a few Hz), so that it is within a range readily detectable by digital video camera 68 (or by another light sensor) within the interactive display table. Upon detecting a pattern of the modulated light on interactive display surface 64a, the interactive display system responds by carrying out the predefined function for the application that is currently being executed by the interactive display system.

It is also contemplated that different modulation frequencies could be used in different light pointers so that the specific light pointer providing the pattern of modulated light on the interactive display surface can be readily identified by the interactive display system with the digital video camera or other light sensor. As another option, is also contemplated that switch 194 can be completely disposed within the housing and selectively activated by the force of gravity when light pointer 180 is inverted to direct the modulated light source 184 toward the interactive display surface. In this embodiment, switch 104 would be coupled in series with switch 194, and switch 194 would comprise a single-pole, double-throw (SPDT) switch that is connected to selectively energized either continuous light source 182 or modulated light source 184 when switch 104 is selectively closed, depending upon the vertical orientation of light pointer 180.

Digital video camera 68 is used in connection with an IR filter so that it is sensitive only to IR light. Accordingly, light emitting source 196 and light emitting source 202 preferably produce IR light. However, it is also contemplated that a light sensor responsive to a different waveband of light could instead be used within the interactive display table and if so, light emitting sources 196 and 202 would be selected to emit light within that waveband. Accordingly, in other preferred embodiments, the light emitted by light emitting sources 196 and 202 might be visible, or ultraviolet, or coherent light (if laser light emitting sources are used). Thus, light emitting sources 196 and 202 are preferably either IR light emitting diodes (LEDs), visible light LEDs, or laser LEDs.

FIG. 12 illustrates a light pointer 210, which projects a light beam 212 forming a crosshair pattern 214 comprising lines 216 and 218. Light pointer 210 includes a laser light source that emits either IR or visible light. The spread of such light sources can be better controlled so that they do not attenuate as much over relatively short distances as the non-coherent light produced by conventional LEDs. Consequently, in the context of the present invention, a user may interact with the interactive display table using light pointer 210 at a greater distance, and/or the interactive display system can more easily detect a pattern of light produced by this light pointer at a greater distance. Most laser light sources generate a single spot of light. A light source producing a single spot of laser light that is used in a light pointer in accord with the present invention could implement a simple two-dimensional cursor, but that pattern might not permit some of the other features of the present invention to be implemented, such as the ability to determine the distance and orientation of the light pointer from the interactive display surface based upon the projected shape and size of the pattern produced thereby.

However, a number of techniques can be used to generate predefined patterns or shapes using a light pointer generally like that discussed above. Such a light pointer with a laser light source can produce lines and crosshairs (e.g., using inexpensive plastic cylindrical lenses like those that are often used on laser levels), or squares, circles, arrows, and other shapes (using holograms). Shapes or patterns of this sort are often produced by light pointers used in presentations. Light pointer 210 projects crosshair pattern 214, which enables a tilt angle or orientation of the light pointer to be readily determined, although with some ambiguity. In addition, based upon the size of the crosshair (assuming that it lies entirely on the interactive display surface), it is also possible to determine the distance between light pointer 210 and the interactive display surface.

In FIG. 12, light pointer 210 projects light beam 212 along a path that is substantially normal to interactive display surface 64a. As a result, lines 216 and 218 are substantially perpendicular to each other. In contrast, in FIG. 13, light pointer 210 is oriented at an acute angle relative to interactive display surface 64a. This angled orientation of the light pointer produces a crosshair pattern 214' in which lines 216 and 218 are not perpendicular to each other, but instead define oblique and acute angles. Based upon any of these angles, it is possible to determine the orientation of light pointer 210. Likewise, based upon a predefined spread with distance of light beam 212 and assuming that crosshair pattern 214 is fully on interactive display surface 64a, it is possible to determine the distance between light pointer 210 and the interactive display surface.

Using crosshairs for the pattern produced by a light pointer with a laser light source can have the additional advantage of enabling the interactive display system to very precisely locate the intersection of lines 216 and 218. These lines may extend over much of the interactive display surface, and by making many observations of the lines to collect data regarding their disposition on the interactive display surface, a precise estimate of the angle between the lines and their position may thus be computed. From these data, a cursor position corresponding to the intersection of the two lines can be precisely determined.

Using a light pointer to project shapes such as squares, circles, and arrows has the advantage that the distance and tilt of the light pointer may be computed in a manner generally analogous to that of the other embodiments of the light pointer in which a non-coherent light source is employed. For example, if coherent light is used to project a circular pattern, the result is very closely analogous to the circular/elliptical shape of a pattern produced by the non-coherent light source used in pointer 100. Similarly, the size, of the projected circle/ellipse can also be used to estimate the distance between a light pointer having a laser source and the interactive display surface, by comparing a known size of the projected pattern and a specific distance against the size of the pattern detected by a light sensor on the interactive display surface. Another advantage of projecting discrete shapes rather than crosshairs is that the projected shapes will typically be relatively small and therefore brighter and easier to detect and will more readily fit entirely on the interactive display surface.

If the projected pattern is not rotationally symmetrical, it should be possible to also compute the full six degrees of freedom (x, y, z, yaw, pitch, and roll) for the light pointer, except for the ambiguity related to one reflection about the interactive display surface. For some non-symmetric laser projected light patterns, it should be possible to determine the direction of the angled orientation of the light pointer based upon a foreshortening of the pattern on the interactive display surface, particularly at greater angles (i.e., when the light pointer is further from the perpendicular to the interactive displays surface). Although not shown, it should also be apparent that the light pointer producing a non-symmetric light pattern (e.g., an arrow) on the interactive display surface could be designed to define a "natural" orientation when held by a user, i.e., with a shape or housing configuration that generally encourages the light pointer to be held in a specific orientation, so that an angled directionality of the light pointer would be evident by detecting the direction in which the projected pattern of light points. For example, if the housing were designed to provide a pistol grip that is held by the user, the orientation of the light pointer would normally encourage the pistol grip to be held in a user's hand, so that the butt of the grip is directed downwardly.

FIG. 14 illustrates a hologram-based projection of a laser source by light pointer 210 along a light beam 220. The projection corresponds to an arrow pattern 222. In addition, other such shapes can be projected, such as a square, a circle, a circle with a small crosshair, etc.

In FIG. 15, an alternative embodiment of a light pointer 100' is illustrated. This light pointer includes a visible light source 230 that is activated by switch 104 to continuously project a visible light pattern while the light pointer is being held by a user, as well as an IR (or other non-visible) light source 232 that is selectively activated by a user using with switch 194. Both of these light sources are disposed at the same end of the light pointer and preferably cast light patterns of equal size and shape. However, it is also contemplated that the visible light pattern might be sized and shaped differently than the non-visible light pattern, so long as they are directed to the same region on the interactive display surface. Also, switch 104 could be replaced with a touch sensitive (i.e., a capacitive responsive switch) that is coupled to the housing of the light pointer so that the visible light source is activated as soon as the light pointer is grasped by a user, or could comprise a motion sensor that is activated when the light pointer is moved about, but deactivated after a predefined time interval when no motion is sensed. The purpose of including both a visible and a non-visible pattern of light is to enable the user to move the visible pattern about on the interactive display surface until it is disposed where desired, and then, to activate switch 194, so that non-visible light source 232 is energized, casting the pattern of non-visible light onto the interactive display surface so it will be detected by the interactive display system. Thus, the visible light pattern acts more like a conventional cursor that is evident on a PC monitor, and activating switch 194 is analogous to depressing a button on a pointing device that controls the position of the cursor.

Although the interactive display system may optionally project a visible light pattern corresponding to the non-visible light pattern of the light pointer, the visible light projected by the interactive display system would only be visible on the interactive display surface after a user had activated the non-visible light source to direct its pattern onto the interactive display surface. Thus, the user can determine where the non-visible light will interact with the interactive display surface before activating switch 194 to energize non-visible light source 232.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for providing an input to an interactive display system, wherein the interactive display system includes an interactive display surface and is able to display images and detect objects that are proximate to the interactive display surface, comprising steps for:

enabling a user to provide an input by directing light from a light source onto the interactive display surface to illuminate a portion thereof with the light from the light source; and detecting the light illuminating the portion of the interactive display surface with a light sensor that is also used for detecting light reflected from objects that are proximate to the interactive display surface, the light sensor producing a signal that is input to the interactive display system;

determining a disposition and orientation of the light source based on characteristics of the signal that is produced by the light sensor, in response to a pattern with which the portion of the interactive display surface is illuminated by the light source, and wherein determining the disposition and the orientation of the light source comprises a step for determining a shape and an orientation of the pattern on the interactive display surface, and wherein the pattern is circular in shape when the light source directs the light onto the portion of the interactive display surface along a path that is normal to the interactive display surface, and the pattern is elliptical in shape when the light source directs the light onto the portion of the interactive display surface along a path that is not normal to the interactive display surface.

2. The method of claim 1, wherein the step for determining the disposition and the orientation of the light source further comprises a step for determining a relative intensity of the light within the pattern between opposite ends of the pattern, a higher intensity at one end of the pattern indicating that said one end of the pattern is closer to the light source than an opposite end of the pattern.

3. The method of claim 1, wherein the step for determining the disposition and the orientation of the light source further comprises a step for determining a distance of the light source from the interactive display surface based upon a size of the pattern.

4. The method of claim 1, further comprising a step for modulating the light produced by the light source to provide a different input to the interactive display system than is provided using light from the light source that is not modulated.

\* \* \* \* \*